No. 752,284. PATENTED FEB. 16, 1904.
J. A. DAHLQVIST.
CENTRIFUGAL LIQUID SEPARATOR.
APPLICATION FILED MAR. 6, 1903.

NO MODEL.

Witnesses
Evald Delman
Gerda Lindkvist

Inventor
John A. Dahlqvist
by Orop Dahl
his atty

No. 752,284.

Patented February 16, 1904.

UNITED STATES PATENT OFFICE.

JOHN ALFRED DAHLQVIST, OF STOCKHOLM, SWEDEN, ASSIGNOR TO NYA AKTIEBOLAGET RADIATOR, OF STOCKHOLM, SWEDEN, A STOCK COMPANY.

CENTRIFUGAL LIQUID-SEPARATOR.

SPECIFICATION forming part of Letters Patent No. 752,284, dated February 16, 1904.

Application filed March 6, 1903. Serial No. 146,538. (No model.)

*To all whom it may concern:*

Be it known that I, JOHN ALFRED DAHLQVIST, a subject of the King of Sweden and Norway, and a resident of Stockholm, Sweden, have invented new and useful Improvements in Liners for Centrifugal Separator-Drums, of which the following is a specification, reference being had to the drawings accompanying and forming a part hereof.

This invention relates to improvements in such liners for centrifugal separator-drums which consist of conical plates or the like, which divide the milk in the drum radially into thin layers—for instance, such as described in the Letters Patent No. 432,719, dated July 22, 1890—the object of my present invention being to increase the efficiency of such liners.

The invention consists, briefly, in arranging between the outer edges of the said conical mantles and the inside of the drum a number of inclined or screw-shaped wings or the like, the upper ends of which are forward of their lower ends, for the purpose of causing a downward pressure—*i. e.*, a resistance—in the layer of milk between the conical plates and the wall of the drum.

In the accompanying drawings I have illustrated a suitable constructional form of my invention.

Figure 1:
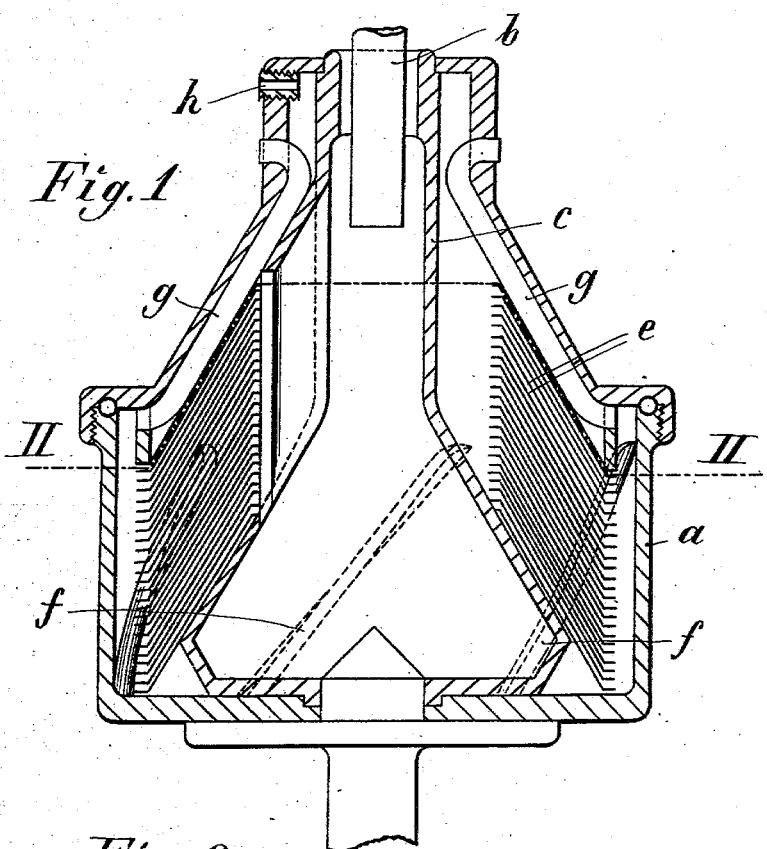
Figure 2:
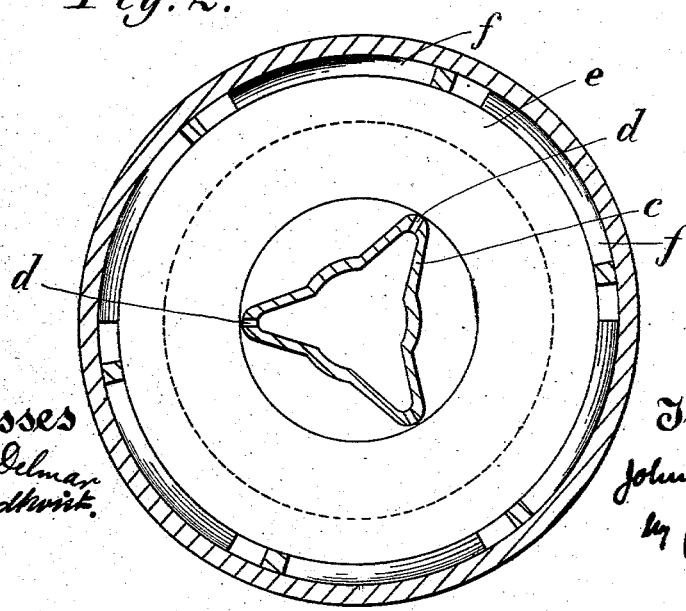

Figure 1 shows a central vertical section of a centrifugal separator-drum and a liner of the above-mentioned kind, and Fig. 2 a section on line II II in Fig. 1.

Referring to the drawings, *a* represents the drum; *b*, the usual central inlet-pipe; *c*, a distributing-pipe having outlet-slots *d* for the full milk. Said pipe *c* supports the conical mantles *e*, which divide the liquid in thin layers across the radial lines of the bowl. *g* represents the usual skim-milk outlets, and *h* the cream-outlet. In the space between the outer edges of the said mantles and the inside of the drum are arranged a number of inclined or screw-shaped wings *f* or the like, suitably made integral with or attached to the drum. The position of the latter is such in relation to the direction of movement of the bowl that their upper ends during the rotation of the latter are forward of their lower ends. On account thereof the said wings will cause a certain resistance against the upward movement of the blue milk along the inside of the drum, thus effecting a downward pressure outside the conical plates, which pressure will be largest at the bottom of the drum and will in a certain degree check the outward movement of the liquid between the lower plates. On account thereof the full milk continuously fed into the separator-drum will be compelled to move outward between the upper plates and to fill up the rooms between the same more than would otherwise be the case, whereby all the rooms between the conical mantles will be fully utilized. The said increased pressure near the wall of the drum will also give the cream particles still retained in the blue milk an effective movement inward, so as to prevent the flowing out of the same through the blue-milk outlet or outlets.

Though I have above described my invention with respect to the separation of milk, it will be easily understood that a liner constructed in accordance with my present invention may be used also for the separation of other liquids the constituents of which have different specific weight.

Having now particularly described my invention and in what manner the same may be performed, what I claim as new, and desire to secure by Letters Patent, is—

The combination with a centrifugal separator-drum having a liner consisting of conical plates which radially divide the contents of the drum into thin layers, of inclined wings between the outer edges of the said mantles and the inside of the drum, substantially as and for the purpose set forth.

In testimony whereof I have signed my name to this specification in the presence of two subscribing witnesses.

JOHN ALFRED DAHLQVIST.

Witnesses:
 EVALD DELMAR,
 KARL RUNCSKOG.